United States Patent [19]

Gasser

[11] Patent Number: 5,511,298

[45] Date of Patent: Apr. 30, 1996

[54] DEVICE FOR SETTING A SELF-DRILLING CLAMPING FASTENER

[75] Inventor: Daniel Gasser, Rebstein, Switzerland

[73] Assignee: SFS Industrie Holding Ag:, Heerbrugg, Switzerland

[21] Appl. No.: 175,375

[22] PCT Filed: Apr. 20, 1993

[86] PCT No.: PCT/EP93/01044

§ 371 Date: Jan. 6, 1994

§ 102(e) Date: Jan. 6, 1994

[87] PCT Pub. No.: WO93/02322

PCT Pub. Date: Feb. 4, 1993

[30] Foreign Application Priority Data

May 6, 1992 [DE] Germany .................. 42 15 008.6

[51] Int. Cl.⁶ .................................................. B21J 15/26
[52] U.S. Cl. .................... 29/243.526; 72/391.8
[58] Field of Search ................ 29/243.526; 72/391.8

[56] References Cited

U.S. PATENT DOCUMENTS

| 3,659,449 | 5/1972 | Abernathy | 72/391.2 |
| 4,910,992 | 3/1990 | Stenberg et al. | 29/243.526 |
| 5,219,375 | 6/1993 | Kamata et al. | 29/243.526 |

FOREIGN PATENT DOCUMENTS

| 0456269 | 11/1991 | European Pat. Off. . | |
| 4020902 | 1/1992 | Germany | 29/243.526 |
| 4114377 | 11/1992 | Germany | 29/243.526 |
| 4119935 | 12/1992 | Germany | 29/243.526 |
| 2187240 | 9/1987 | United Kingdom . | |
| 9222394 | 12/1992 | WIPO . | |
| 11890 | 6/1993 | WIPO | 29/243.526 |

*Primary Examiner*—David Jones
*Attorney, Agent, or Firm*—Helfgott & Karas

[57] ABSTRACT

A device for setting a self-drilling clamping fastener has a fixed external housing, a sleeve-shaped mounting member in which clamping jaws for gripping the shaft of the fastener are retained, a drive sleeve coupled to a rotary drive and a guide sleeve. The guide sleeve and the drive sleeve both are rotatably positioned in the housing. The guide sleeve can be prevented from turning by detent elements movably positioned in the housing. The drive sleeve and the guide sleeve are coupled to each other so that a force during the drilling process is transferred from the drive sleeve to the guide sleeve. The guide sleeve can be rotated together with the mounting member inside the housing in one direction only in a free-wheel fashion.

12 Claims, 3 Drawing Sheets

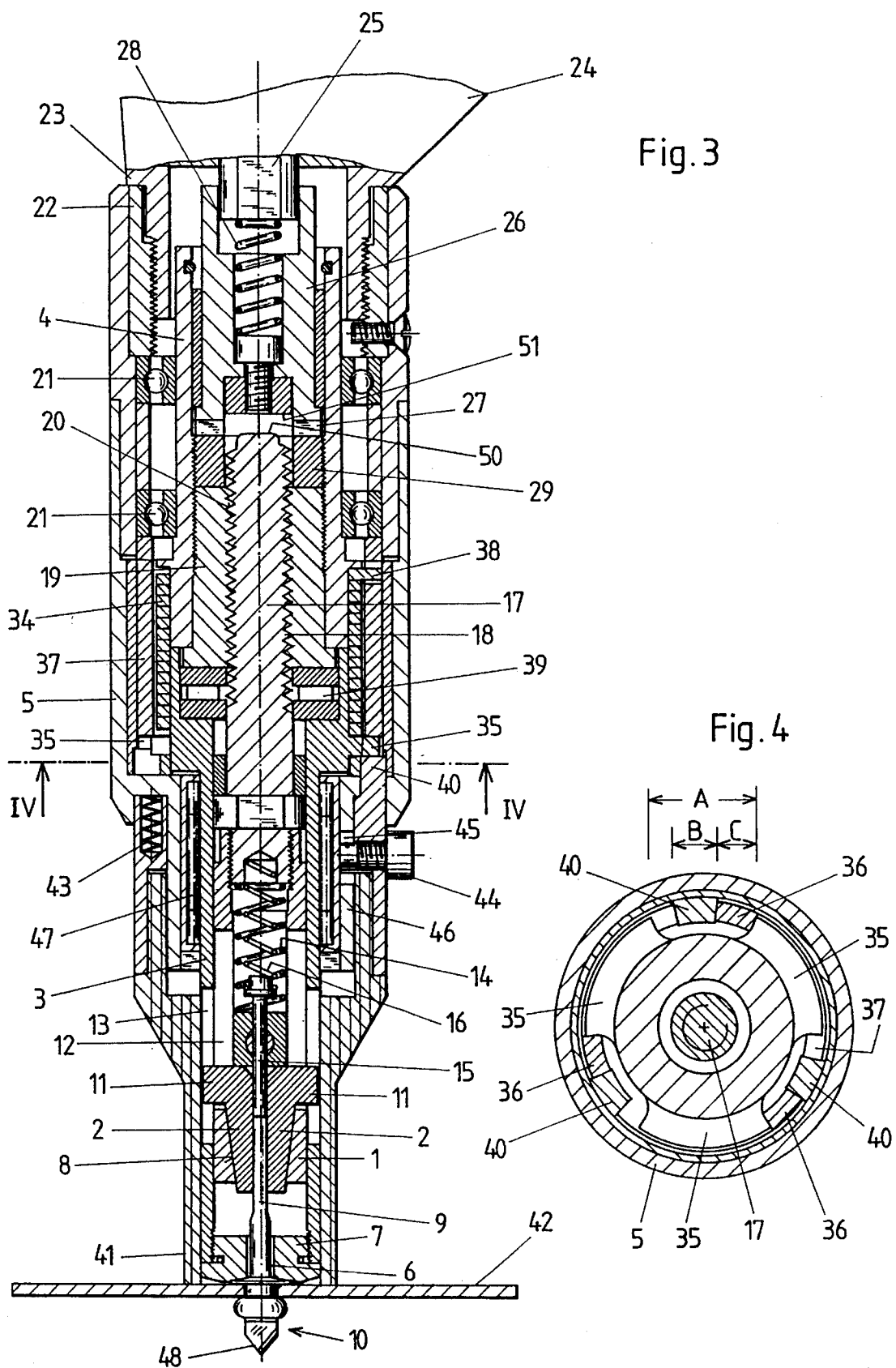

5,511,298

DEVICE FOR SETTING A SELF-DRILLING CLAMPING FASTENER

BACKGROUND OF THE INVENTION

The invention relates to a device for setting a self-drilling clamping fastener with clamping jaws held in a sleeve-like reception part for gripping a traction mandrel of the clamping fastener, wherein the reception part has an outer threading at its end that is turned away from the clamping jaws and engages a threaded bore of a driving sleeve that can be coupled with a rotary drive, wherein the reception part can be kept from turning.

In a known device for the setting of blind rivets (EP-A-0 213 101), a pot-like bushing is rotatably arranged in a housing, wherein this bushing is, on the one hand, provided with an inner thread and, on the other hand, is tightly connected with the rotary drive. A reception part, carrying the clamping jaws for a traction mandrel of the blind rivet, is provided at its rearward end with an outer thread, wherein this outer thread engages the inner thread of the bushing. During the drilling process, all parts of this device rotate, i.e., also the externally located housing. Upon completion of the drilling process, the direction of rotation of the device must be reversed, for which purpose the housing itself must remain in a fixed position. Either the housing may be prevented from rotating further by holding it in place, or the housing may move a short distance, while the direction of rotation is changed in the direction towards the rotary drive, and is then present at one housing portion.

Upon setting the blind rivet, the direction of rotation of the drive must again be changed in order to bring the reception part carrying the clamping jaws back into the initial position. For this purpose, the housing must be held manually in order to effect an axial movement of the reception part due to the thread engagement. On the one hand, it is problematic when with a setting device in a driven part, a manual intervention has to take place; on the other hand, there exists the danger that during unintentional activation, for example during the drilling process, the operator may be burned as a result of the great generation of heat.

Furthermore, a setting device for blind rivets has become known (EP-A-0 456 269) which works approximately on the same principle as the previously mentioned setting device. Here, an additional coupling is simply provided between the driving sleeve, having the inner thread, and a driving part that can be mounted directly to the driving device, wherein this coupling can be released in that, during retraction of the section of the receiving part provided with the outer thread, after a certain path abuts against the free end of same and penetrates the driving part directly connected with the driving device until the coupling is released. Also with this arrangement, it is absolutely necessary that the user manually intervene at the housing in order to introduce pulling movement after a drilling process, during which the entire setting device portion rotates.

SUMMARY OF THE INVENTION

The present invention addresses the task of creating a device of the initially mentioned type, by means of which a fixed outer housing is present during the entire work process, so that the user of the device does not have to engage rotating parts or hold them in place.

According to the invention, this is achieved in that the sleeve-like reception part can be axially moved inside a guiding sleeve, but is secured against turning, in that the guiding sleeve and the driving sleeve can be coupled to each other in a force- and/or form-fitted manner in the direction of the drive rotation, in that the guiding sleeve and the driving sleeve are rotatably arranged in a housing that can be rigidly connected with the housing of the drive, in that the guiding sleeve can be prevented from turning by means of catch elements that are movably arranged inside the housing and in that the guiding sleeve, together with the reception part, can be rotated inside the housing in only one direction in the manner of a free-wheel arrangement.

Since the sleeve-like reception part is separate from the guiding sleeve, the reception part may indeed be moved in the axial direction even during engagement of the thread portion with the threaded bore for the purpose of setting the self-drilling clamping fastener; however, this reception part is to assume no function regarding the rotary drive. It is merely necessary to require that the sleeve-like reception part be secured against turning with respect to the guiding sleeve.

It is of particular advantage that the guiding sleeve and the driving sleeve can be coupled to each other, so that the force transfer during the drilling process is transferred from the driving sleeve to the guiding sleeve and thus the outer housing parts are constructed in stationary form. Thus, it is never necessary for the user of the device to have to delay or stop a rotation part. On the contrary, during a setting process, the user can readily place one hand on the housing itself, since this portion can never turn, as it can be rigidly coupled to with the housing of the drive.

By means of the present invention, the necessary conversion of the drilling movement to the traction movement has been achieved in an essentially effective manner.

Finally, the step during which the guiding sleeve together with the reception part can be rotated inside the housing in merely one direction in the free-wheel manner has a positive effect. Also, this step contributes to the fact that a stationary housing can be obtained, since precisely through this free-wheel effect the possibility is created of returning the sleeve-like reception part again to the initial position.

Through the realization of the measures of the invention, it has become possible to effect the drilling process as well as the setting process for a self-drilling clamping fastener in one direction of rotation of the driving device, without the need for any switching functions or manual interventions in the area of the housing or the like. Thus, in no case is a manual intervention in the rotating part necessary, so that the danger of injury can be eliminated by means of a closed housing that never rotates.

It is furthermore advantageous in the present invention that the driving sleeve accommodates a drive part that can be coupled directly with the rotary drive in an axially displaceable manner, wherein the driving part has lock-in claws at the end turned away from the rotary drive. These claws can be effectively connected to a claw ring formed in the interior of the driving part.

In this way, a very simple coupling between the drive part and the driving sleeve is possible, wherein merely the claws that grip into each other in the axial direction are needed in order to effect the locking-in in either direction of rotation. Furthermore, precisely by means of this simple construction of the coupling between the driving sleeve and the driving part, a simple release of the coupling is possible.

In this connection, it is advantageous when the claws are arranged and freely protrude coaxially to the central axis of the drive part and the driving sleeve, and have at their lateral borders working surfaces converging towards each other as viewed in the direction of rotation, wherein the free-end area of the claws is formed by a plane extending obliquely as viewed in the direction of rotation. By means of these two sharp-angled working surfaces, a very simple means is created for effecting a torque-dependent stopping of the coupling, since the spring-loaded drive portion is lifted off in the axial direction sooner or later when the drive continues to operate depending on the angle of incline of the claws gripping into each other. By means of the oblique plane at the free end of these claws, it has been achieved in a simple manner that in the one direction of rotation an earlier uncoupling takes place than in the other direction of rotation, and that following the uncoupling and during the change of the direction of rotation into the opposite direction of rotation, a locking-in occurs again, although the coupling does not yet become entirely mutually engaged in the axial direction. However, since for the return of the device to the initial position hardly any great forces need to be transferred, this small intervention suffices for effecting the return movement.

According to an additional characteristic of the present invention, provisions are made that the coupling, arranged between the guiding sleeve and the driving sleeve and effective in only one direction of rotation, is in the form of a wrap-spring coupling. Thus, with the arrangement of the invention, the effect of a known construction on the coupling sector is utilized for employing an effective coupling, which can be readily released, in a relatively narrow space. Since this coupling between the guiding sleeve and the driving sleeve is not an overload coupling, i.e., does not have to carry out a torque-dependent stopping action, the snug, threading-like arrangement of this wrap-spring coupling on the ends of the guiding sleeve and the driving sleeve facing each other suffices. More precisely, due to this wrap-spring coupling, a particularly small construction of the device is possible.

In this connection, it is advantageous that the guiding sleeve and the driving sleeve have the same outer diameter at their end areas that face each other, wherein the wrap-spring coupling is wrapped across nearly identical lengths of the guiding sleeve and the driving sleeve.

Thus, this coupling can continuously rest snugly on the two facing end areas, wherein by means of the radially applied force alone, created by turning in the correct direction, a nearly rigid connection between the driving sleeve and the guiding sleeve is created.

An additional characteristic provides that the guiding sleeve has radially outwardly protruding finger-like extensions, between which axially aligned catches of a pipe section coaxially surrounding the wrap-spring coupling grip at the section connecting to the wrap area by means of the wrap-spring coupling, wherein a slit or an opening is provided for engaging a radially protruding end of the wrap-spring coupling away from the protruding catches. Through these steps, on the one hand, a rapid engagement of the wrap-spring coupling is always immediately assured at the beginning of rotation, and on the other hand, meanwhile, an immediate uncoupling takes place when the driving sleeve is turned in the opposite direction. Then, by holding the radially protruding end, the wrap-spring coupling is held in a looser position at a small distance from the surface of the driving sleeve and the guiding sleeve. Otherwise, the end accommodating the radially protruding end of the wrap spring can be turned only across a small sector with respect to the guiding sleeve, since the latter grips with the protruding catches between the radially outwardly protruding, finger-like extensions. The wrap spring of the wrap-spring coupling is thus indeed held with respect to the guiding sleeve; however, the driving sleeve can move inside this wrap-spring coupling without a force transfer onto the coupling being possible.

A particularly advantageous measure, precisely with respect to the fact that the externally located housing is stationary, i.e., does not rotate, lies in that the catch elements for stopping the rotation of the guiding sleeve inside the housing form a part of a bit stop, and can be released by a bit stop and/or by means of a manually serviceable operating element, accessible at the outer surface of the housing. These catch elements are thus stopped by means of an axial displacement during the impact of a bit stop after the drilling process, wherein the catch elements may form a part of this bit stop. However, it is also possible that the catch elements are released through the movement of the bit stop. However, within the framework of the invention it is also conceivable to provide, for example, a push button at the surface of the housing by means of which catch elements, preventing the guiding sleeve from further turning, are inserted. Here it does not matter whether these catch elements are moved in the axial or in the radial direction.

Furthermore, an advantageous measure lies in that the free space remaining between the radially protruding extensions of the guiding sleeve (as viewed in peripheral direction) is greater than the sum of the dimensions of one of the catch elements displaceable within the housing and of one of the catches protruding from the tubular piece, as measured in peripheral direction. When the catch elements are pushed in, the catches of the tubular piece, surrounding the wrap-spring coupling, become engaged as well as the catch elements that are displaced upon completion of the drilling process.

Thus, on the one hand, in a simple manner, the effect of the wrap-spring coupling is canceled out and, on the other hand, an additional turning of the guiding sleeve is prevented.

In this connection, provisions are made that in the stop position of the guiding sleeve, the catch elements displaceable inside the housing, as well as the catches protruding from the tubular piece, grip between the radially protruding extensions of the guiding sleeve from axially opposing sides. Thus, the radially protruding extensions perform a double function, on the one hand one of limiting the relative rotational movement of the tubular piece surrounding the wrap-spring coupling with respect to the guiding sleeve, and on the other hand, one of bringing about the interaction with the inserable catch elements.

In a very simple and effective arrangement it is proposed that the catch elements be part of a tubular, spring-loaded bit stop, displaceable in the axial direction against the housing, and coaxially surrounding the front area of the guiding sleeve. For this reason, it has become possible in a simple manner to bring about the change-over to a traction movement for setting the clamping fastener, wherein upon impact of the bit stop on the surface of the work piece, this bit stop is pushed back in the axial direction, thus appropriately sliding the catch elements into the housing and preventing additional turning of the guiding sleeve.

In order to permit a simple return of the guiding sleeve and reception part to the initial position, it is proposed that between the guiding sleeve and the housing or the bit stop forming a housing portion a plain bearing is used having a free-wheel action so that by means of a simple known machine construction element, a stopping action in the one direction of rotation can be achieved. Thus, during the drilling process, the guiding sleeve can turn with respect to the housing without any problems, whereas during turning in the other direction—as is necessary during the return of the device into the initial position—a blocking effect occurs. Then, in an effective manner, the threaded connection between the driving sleeve and the part of the reception part provided with the outer threading is again brought into action.

Additional characteristics of the invention and special advantages are explained in greater detail in the subsequent description by means of the drawings.

FIG. 3 shows a cross section through the device as in FIG. 1, however the parts are shown in the position in which they are arranged following the nearly completed setting of the clamping fastener;

FIG. 4 shows a cross section along the line IV—IV in FIG. 3;

DETAILED DESCRIPTION OF THE PREFERRED EMBODIMENTS

Figure 1:
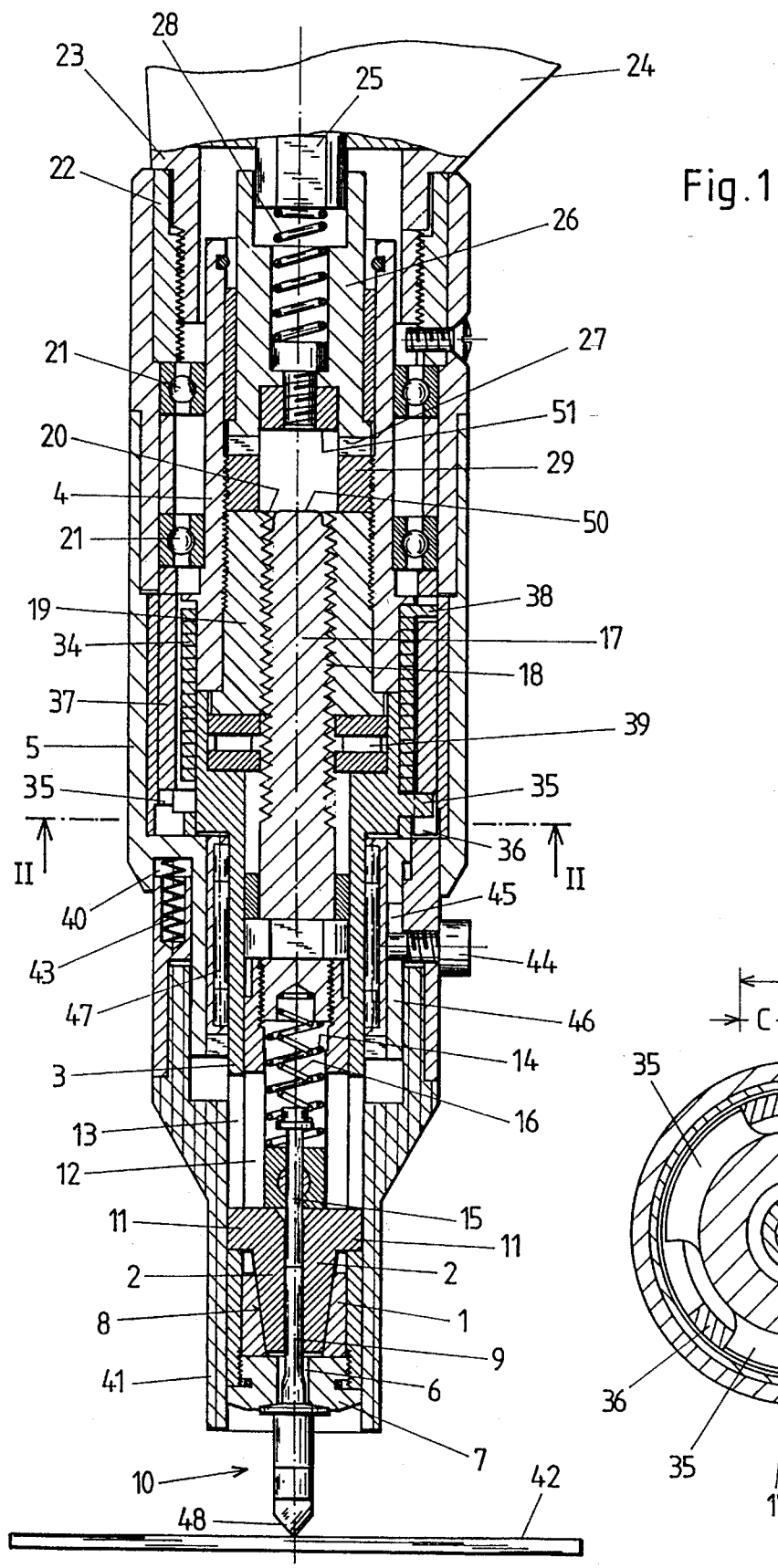
FIG. 1 shows a cross section through the device of the invention representing the state prior to the beginning of the drilling process.
Figure 2:
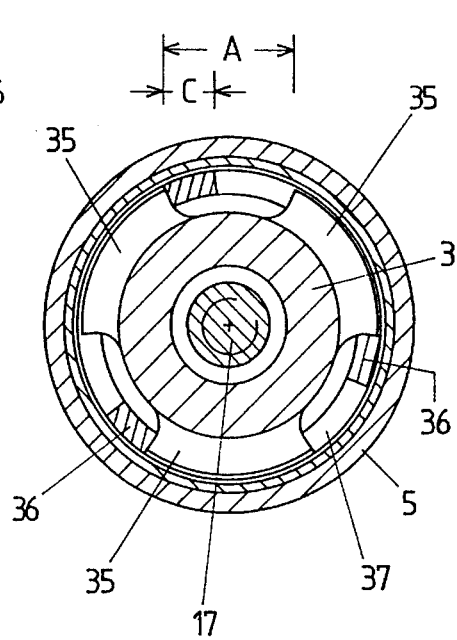
FIG. 2 shows a cross section along the line II—II in FIG. 1.
Figure 5:
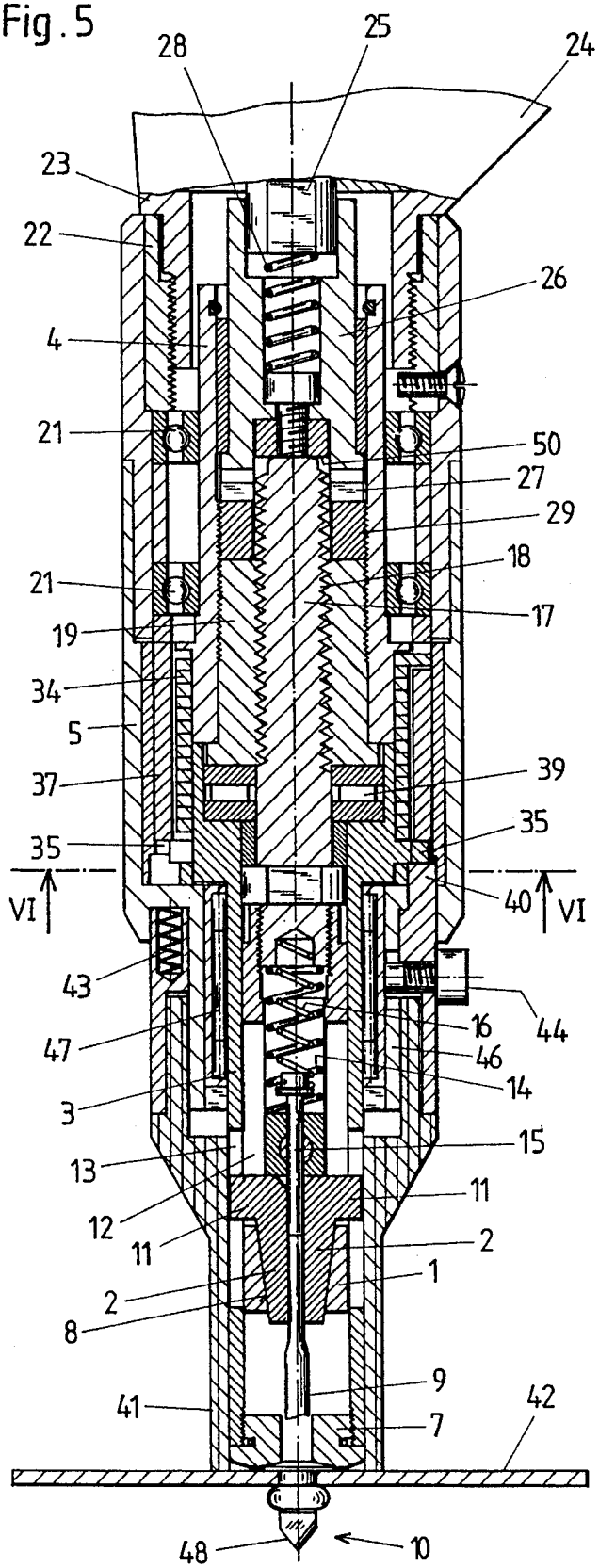
FIG. 5 shows an additional longitudinal cross section through the device, wherein with this position of the individual parts the traction mandrel is already torn off and the clamping fastener has been completely set.

The device consists essentially of a sleeve-like reception part (1) for holding the clamping jaws (2), a guiding sleeve (3), a driving sleeve (4) and a housing (5).

The guiding sleeve (3) is closed by means of a closure element (7) at its front end area, except for a central passage opening (6). This closure element (7) may, for example, be provided with a threading and thus may be screwed into the end of the guiding sleeve (3). The closure element (7) also forms the axial stop for the reception sleeve (1). Due to the oblique surfaces (8) at the inside of the reception sleeve (1) and at the outside of the clamping jaws (2), during retrieval of the reception part (1), faulty gripping of the clamping jaws (2) occurs at the inserted traction mandrel (9) of a self-drilling clamping fastener (10). The clamping jaws (2) have radially outwardly protruding extensions (11) arranged in parallel longitudinal grooves (12 and 13) inside the reception casing (1) and in the guiding sleeve (3). Thus, the clamping jaws (2) receive a two-fold significance, namely, on the one hand that of holding the traction mandrel during the setting process, and on the other hand that of securing against turning between the reception sleeve (1) and the guiding sleeve (3). The clamping jaws (2) are loaded by a spring (14) in the direction towards the free end of the device. Furthermore, an axially displaceable bolt (15) is inserted between the jaws (2) and loaded by a spring (16). This bolt (15), upon completion of the setting process, brings about the spring-loaded ejection of the torn-off traction mandrel (9).

At the end area of the reception casing, facing away from the clamping jaws (2), a threaded bolt (17) is provided that is provided with an appropriate outer threading (18).

Advantageously, the guiding sleeve (3) is composed of two parts, i.e., of the actual casing and the threaded bolt (17), screwed in at the one end. It would also be possible to form these two sections in one piece or to construct the threaded bolt (17) as a hollow element.

The driving sleeve (4) has an insert (19) which is provided with an inner threading (20). This insert (19) is in the form of a nut. The outer threading (18) of the threaded bolt (17) and the inner threading (20) of the insert (19) thus are effectively connected to each other. Between the driving sleeve (4) and the housing (5), appropriate radial bearings (21) are used. The housing (5) is provided at its rearward end with a threaded insert (22) in order to connect the housing (5) tightly to an appropriate, tubular connection piece (23) of the motor drive (24). For the transfer of the rotational movement from the drive (25) to the driving sleeve (4), a driving part (26), which can be coupled with the rotary drive (25), is provided, wherein the mutual coupling takes place via claws (27).

For this purpose, the driving part (26) is placed onto the rotary drive (25) in a form-fitting and axially displaceable manner, supported opposite same with a spring (28), and thus always strives to maintain an effective connection with the driving sleeve (4) via the claws (27). Thus, this drive part has at its end, which is turned away from the rotary drive (25), locking-in claws (27) that can be effectively connected to a claw circle (29), formed in the interior of the drive part (4). The claws (27) at the driving part (26) and the claws (30) at the claw ring (29) are arranged coaxially to the central axis of the driving part (26) and the driving sleeve (4) and freely project against each other. At their lateral borders, as viewed in the direction of rotation, these claws (27) and (30) have working surfaces (31, 32) that converge towards each other. The free end area (33) of the claws (30) is formed by a plane extending obliquely, as viewed in the direction of rotation. Thus, it is assured that in the one direction of rotation (as will be explained in greater detail), an uncoupling can take place earlier than in the other direction of rotation.

The guiding sleeve (3) and the driving sleeve (4) can be coupled to each other in a force- and/or form-fitted manner in one rotary drive direction. The most advantageous arrangement lies in that this coupling is in the form of a wrap-spring coupling (34). A wrap-spring coupling is a spring element in which a spring wire of usually square or rectangular cross section wraps around the two parts that bluntly abut against each other in a screw-like manner. The guiding sleeve (3) and the driving sleeve (4) have the same outer diameters at the ends facing each other, wherein the wrap-spring coupling (34) is wrapped across nearly the same length of the guiding sleeve (3) and driving sleeve (4).

The guiding sleeve (3) has radially outwardly extending, finger-like extensions (35) at the section connecting to the wrapping area by means of the wrap-spring coupling (34). Between these extensions (35), axially aligned catches (36) of a tubular piece (37), coaxially surrounding the wrap-spring coupling (34), become engaged. For the protruding catches (36) at the tubular piece (37), a slit or an opening for the engagement of a radially protruding end (38) of the wrap-spring coupling (34) is provided.

In order to prevent wear caused by non-reciprocal coupling between the sequence of sections of the guiding sleeve (3) in the axial direction and the driving sleeve (4), an axial bearing (39) is provided between these two parts.

For the setting process, following the drilling of the work piece, it is necessary that the sleeve-like reception part (1)

and the guiding sleeve (3) carry out no additional rotational movement and thus are stopped with respect to the housing. For this purpose, movable catch elements (40) are provided that can grip into the rotational movement of the guiding sleeve (3). In the arrangement shown, these catch elements (40) form a part of a bit stop (41), i.e., are displaced in the axial direction during the impact of the bit stop with the work piece (42) to be drilled.

Within the framework of the invention, it would also be conceivable that these catch elements (40) be released in some way by a bit stop, i.e., they do not represent a direct component of this bit stop. It would also be possible to activate or to release these catch elements by means of a manually operable operating member, accessible at the outer surface of the housing.

A force- and/or form-fitted coupling between the guiding sleeve (3) and the driving sleeve (4) is also conceivable when the wrap-spring coupling is simply omitted, so that practically speaking, only a force-fitted coupling is assured between the drive part and the rotational parts accommodating the rivet by the threading of the central bolt. The mentioned coupling is used only when a rivet has been used, and from the same an appropriate countertorque is transferred. The torque of the drive arrangement is countered with an appropriate torque only when the rivet must carry out a drilling process, so that essentially a pulling of the rivet mandrel and thus a tensioning of same takes place due to the threaded bolt. Thereby the torque can be appropriately transferred, whereby it is also assured that the rivet casing contributes to the transfer of the torque. As soon as torque is no longer present, which is also the case when the hole is drilled or when the casing is used with the bit stop, an additional turning of the rivet reception part is prevented, whereupon the traction movement is introduced.

Figure 6:
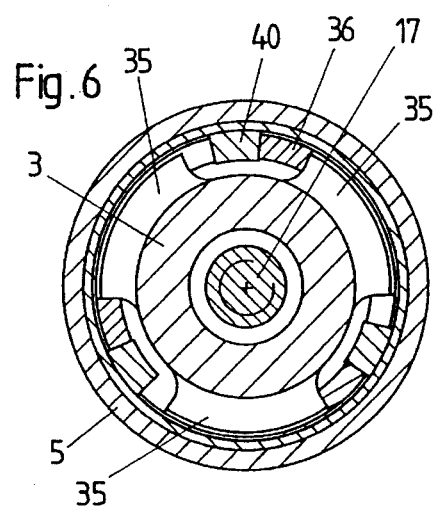
FIG. 6 shows a cross section along the line VI-VI in FIG. 5.

The free space (A) remaining between the radially protruding extensions (35) of the guiding sleeve (3) as viewed in peripheral direction, is greater than the sum of the dimensions (B and C) of one of the catch elements (40) movable in the housing, and one of the catches (36) protruding from the tubular piece (37), as measured in the peripheral direction. As can be seen from the illustration according to FIGS. 4 and 6, in the stop position of the guiding sleeve (3), the catch elements (40), movable inside the housing (5), as well as the catches (36) protruding from the tubular piece (37) from axially facing sides, grip between the radially protruding extensions (35) of the guiding sleeve (3).

As already mentioned, the catch elements (40) in the arrangement shown are a part of a bit stop (41). This bit stop (41) is tubular and by means of a spring (43) is pressed in the direction towards its free end. The bit stop (41) thus forms a closed continuation of the housing (5), since it forms the area of the guiding sleeve (3) that is the farthest forward. For this purpose, an axial displacement of this bit stop (41), kept within limits, is simply provided. However, there is no rotational movement that can be seen or noticed from the outside at any part of the housing (5) or of the bit stop (41) connected thereto. To keep the bit stop (41) from turning with respect to the housing (5) or other parts, and in order to ensure that the axial displacement of the bit stop (41) with respect to the housing (5) remains limited, a screw (44) is provided, free end of which grips into a slot (45) of an internally located collar (46) of the housing (5).

The guiding sleeve (3), including the reception part (1), may be rotatable inside the housing in only one direction, so that during a reversal of the direction of rotation the return of the device into the initial position can take place. For this reason, between the housing (5) or the internal collar (46) of this housing (5) and the guiding sleeve (3), a free-wheel arrangement forming a block in one direction is provided. In the arrangement shown here in particular, a radial bearing (47), acting as a free-wheel arrangement, is involved. This permits a turning of the guiding sleeve (3) inside the housing during the drilling process; however, it locks the guiding sleeve (3) when a rotational load should occur on the guiding sleeve (3) in the other direction of rotation, due to a special load on the threaded bolt in the other direction of rotation.

Figures 7, 9:
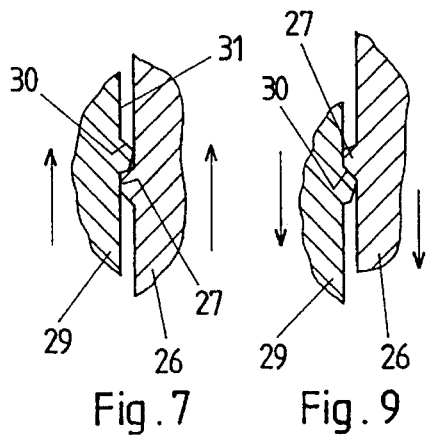
FIGS. 7–10 show different representations of the mutually engaging claws to achieve a coupling between the driving sleeve and a driving portion.

In the subsequent text, a complete operation with a device of the invention will be explained in greater detail:

The device and the individual parts of the device are in an initial position as illustrated in FIG. 1. The housing (5) is rigidly connected to the housing portion (23) of the drive arrangement (24) without any possibility for turning. The self-drilling clamping fastener is slid in at the front face of the device, wherein a traction mandrel comes to rest for the subsequent setting of the clamping fastener between the clamping jaws (2). When the rotary drive (25) is operated, the drive portion (26) also rotates, at which time the claws (27 and 30) engage each other, as can be seen in FIG. 7. Thus, in each case, the driving sleeve (4) is also turned. The wrap-spring coupling (34) enters into action, since this part can tightly wrap around these two facing end areas of the driving sleeve (4) and of the guiding sleeve (3). The tubular piece (37), surrounding the wrap-spring coupling (34) rests with the radially projecting catches (36) at the extensions (35); in this position and in this direction of rotation of the driving part, namely of the driving sleeve, a tightening of the wrap-spring coupling is assured. Thus, in this position, the guiding sleeve is also locked in the appropriate direction of rotation, so that the drilling process inside the work piece (42) can take place.

Figures 8, 10:
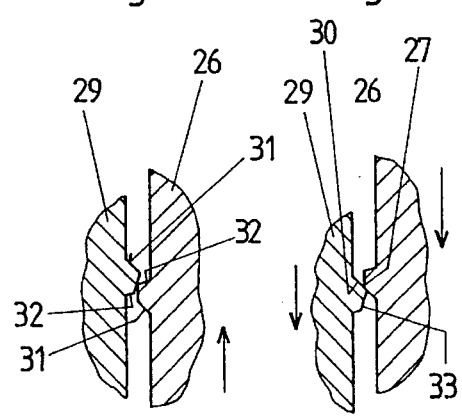

As soon as the drilling process is ended, i.e., when the drill bit (48) exits at the reverse side of the work piece (42), then the entire arrangement moves together with the drive arrangement in the direction towards the work piece (42), so that the bit stop (41) comes to rest on the surface of the work piece (42). The bit stop (41) is then pushed back in the axial direction, so that the catch elements (40) thus engage the catches (36) of the tubular piece (37) or the extensions (35) of the guiding sleeve (3). In this way, an additional turning of the guiding sleeve (3) is prevented, and the wrap-spring coupling (34) is released due to the slight additional rotation of the tubular piece (37). The rotary drive (25), however, is turned in the same direction as before and the claws also (27 and 30) remain mutually engaged. Thus, the driving sleeve (4) as well as the insert (19) of same simply continue to rotate, so that the threaded bolt (17) must move in the axial direction against the driving part (26) in the manner of a threaded spindle. Thus, the clamping fastener to be set is not turned any further, and the traction mandrel (9) is simply gripped more firmly and is pulled back in the axial direction in order to set the clamping fastener and to deform the casing at the rear face of the work piece (42). Thus, during further rotation of the rotary drive (25) only an axial movement of the sleeve-like reception part (1) inside the guiding sleeve (3) takes place. If, during this movement, the appropriate tension force is achieved and the traction mandrel (9) tears off at the provided predetermined breaking point, the sleeve-like reception part (1) continues to move in this direction, since the rotary drive (25) is still active. However, directly thereafter, the free end area (50) of the threaded bolt (17) will impact with the lower end (51) of the driving part (26) and will press it against the force of the spring (28) against the rotary drive (25). This results in a slow decoupling of the claws (27 and 30) until a position is reached as shown in FIG. 8. The claws (27) may overlap each other due to the oblique end areas (33), since the driving part (26) can be moved in a spring-loaded manner against the rotary drive (25). Thus, this results in an interruption of the rotary drive. The mutual decoupling of the claws (27 and 30), however, has taken place to only such a degree that during a reversal of the direction of rotation of the rotary drive (25), the claws can again engage each other in the opposite direction of rotation. A slight intervention suffices for this purpose, as is shown in FIGS. 9 and 10, in order to achieve a force transfer from the driving part (26) onto the driving sleeve (4). By means of this reversed direction of rotation, it is achieved that the threaded bolt (17) moves into the front end position again due to the engagement of the threads until the sleeve-like reception part (1) appears again at the closure element (7) at the front end of the guiding sleeve (3). Then the torque stops, since the working surfaces (31) of the claws (27 and 30) have a relatively flat angle. This is followed by an audible rattling sound, so that the drive arrangement is turned off and it is assured that the arrangement is again in the initial position.

By means of the invention, a structure has become possible that permits the entire operational process to take place without manual intervention with the rotating components.

We claim:

1. A device for setting a self-drilling clamping fastener (10), the device comprising an external housing (5); clamping jaws (2); a sleeve-shaped mounting member (1), said clamping jaws gripping a tension mandrel (9) of the clamping fastener and being retained in said sleeve-shaped mounting member (1); a rotary drive (25) having a motor drive (24); a drive sleeve (4) which is coupled to and being driven by the rotary drive in operation, said drive sleeve (4) having a threaded bore (20), said mounting member (1) having at an end thereof remote from said clamping jaws an external thread (18) engaged in said threaded bore; a guide sleeve (3); means for locking said mounting member (1) against rotation, said mounting member being axially displaceable in said guide sleeve (3) but retained secured against rotation in respect thereto, said guide sleeve (3) and said drive sleeve being coupled to each other by one of a force-fitting coupling and a form-fitting coupling in a driving direction of rotation, said guide sleeve (3) and said drive sleeve (4) being rotatably mounted in said external housing (5), said external housing (5) being fixedly connected to a housing of said rotary drive; and detent members (40) displaceably positioned in said external housing (5) for locking said guide sleeve (3) against rotation for a fastener setting process which follows a drilling process, wherein said guide sleeve (3) together with said mounting member (1) are rotatably positioned in said external housing (5) in a fashion of a freewheel and in one direction only.

2. The device according to claim 1, and further comprising a drive member (26) directly coupled to said rotary drive (25) and being axially displaceably positioned in said drive sleeve (4), said drive member (26) at an end thereof remote from said rotary drive having locking claws (27), said drive sleeve (4) having a claw ring (29) formed inside thereof, wherein said locking claws (27) can be brought into operative connection with said claw ring (29) upon axial displacement of said drive member (26).

3. The device according to claim 2, wherein said claw ring (29) has engagement claws (30) for engagement with said locking claws (27) of said drive member (26), said locking claws (27) and said engagement claws (30) being arranged coaxially to a central axis of said drive member (26) and said drive sleeve (4) and freely projecting towards each other, said locking claws and said engagement claws having lateral boundaries and having at said boundaries mutually converging engagement surfaces (31, 32), wherein said engagement claws (30) have a free end region (33) having an obliquely extending plane, as viewed in the direction of rotation.

4. The device according to claim 1, wherein said coupling between said guide sleeve (3) and said drive sleeve (4) includes a loop spring coupling (34) disposed therebetween and acting only in the direction of rotation.

5. The device according to claim 4, wherein said guide sleeve (3) and said drive sleeve (4) have end regions facing each other, said facing end regions being of an equal diameter, said loop spring coupling (34) being looped over sections of an approximately equal length of said guide sleeve (3) and said drive sleeve (4), respectively.

6. The device according to claim 5, wherein at a portion adjoining a looping region by said loop spring coupling (34), said guide sleeve (3) has finger-shaped extensions (35) which project radially outwardly therefrom; and further comprising a tubular member (37) coaxially surrounding the loop spring coupling (34) and having axially aligned projections (36) engaged with said extensions (35), said loop spring coupling (34) having a radially protruding end (38), said tubular member (37) having a slit for engagement said radially protruding end (38).

7. The device according to claim 1, further comprising a depth-control stop (41) including said detent members (40) for locking said guide sleeve (3) against rotation in said external housing (5), said detent members (40) being released from said depth-control stop (41) by a manually operable operating member accessible from an outer surface of said external housing (5).

8. The device according to claim 6, wherein said finger-shaped extensions (35) of said guide sleeve (3) are radially protruding extensions spaced from each other by a free space (A), as viewed in a circumferential direction of said guide sleeve (3), said free space (A) being greater than a sum of dimensions (B,C) of one of said detent members (40) and one of said projections (36) of said tubular member (37), as measured in said circumferential direction.

9. The device according to claim 8, wherein said detent members (40) and said tubular member (37) are arranged such that in a locking position of said guide sleeve (3), both said detent members (40) and said projections (36) of said tubular member (37) engage from axially opposite ends between said radially protruding extensions (37) of said guide sleeve (3).

10. The device according to claim 1, and further comprising a tubular depth-control stop (41) including said detent members (40), said depth-control stop being spring-loaded in an axial direction of the device and is displaceable towards said external housing (5) and being coaxial with said guide sleeve (3) and surrounding a region of said guide sleeve facing said clamping jaws (2).

11. The device according to claim 1, and further comprising a radial bearing (47) inserted between said external housing (5) and said guide sleeve (3) and acting as a freewheel.

12. The device according to claim 7, wherein said depth-control stop (41) is part of said external housing; and further comprising a radial bearing (47) inserted between said depth-control stop (41) and said guide sleeve (3) and acting as a freewheel.

* * * * *

UNITED STATES PATENT AND TRADEMARK OFFICE
CERTIFICATE OF CORRECTION

PATENT NO. : 5,511,298
DATED : 4-30-96
INVENTOR(S) : Daniel GASSER

It is certified that error appears in the above-identified patent and that said Letters Patent is hereby corrected as shown below:

On the title page; item (22) should be corrected as follows:

PCT FILED: Apr. 30, 1993

Signed and Sealed this

Eighth Day of April, 1997

Attest:

BRUCE LEHMAN

Attesting Officer

Commissioner of Patents and Trademarks